United States Patent
Niemi

(10) Patent No.: US 12,422,053 B2
(45) Date of Patent: Sep. 23, 2025

(54) SAFETY VALVE FOR SUMP PUMP

(71) Applicant: 1636457 Alberta Ltd., Grande Prairie (CA)

(72) Inventor: Russell R. Niemi, Grande Prairie (CA)

(73) Assignee: 1636457 ALBERTA LTD., Grande Prairie (CA)

( * ) Notice: Subject to any disclaimer, the term of this patent is extended or adjusted under 35 U.S.C. 154(b) by 0 days.

(21) Appl. No.: 17/530,687

(22) Filed: Nov. 19, 2021

(65) Prior Publication Data

US 2022/0163126 A1     May 26, 2022

(30) Foreign Application Priority Data

Nov. 25, 2020 (CA) .................................. 3100628

(51) Int. Cl.
     *F16K 17/00*          (2006.01)
     *F16K 31/06*          (2006.01)

(52) U.S. Cl.
     CPC .............. *F16K 17/00* (2013.01); *F16K 31/06* (2013.01)

(58) Field of Classification Search
CPC .......... F16K 17/00; F16K 31/06; E03F 1/006; E03F 1/007
USPC ..... 137/23, 565.16, 565.37; 251/15, 16, 318
See application file for complete search history.

(56) References Cited

U.S. PATENT DOCUMENTS

| | | | | |
|---|---|---|---|---|
| 2,431,640 A * | 11/1947 | Gordon | ..................... | E03F 5/22 210/111 |
| 2,786,542 A * | 3/1957 | Orfel | ........................ | E03F 7/04 137/445 |
| 3,259,357 A * | 7/1966 | Sharp | ...................... | F16K 31/06 251/69 |
| 3,605,799 A * | 9/1971 | Cheme | ..................... | E03F 7/04 137/413 |
| 4,305,818 A * | 12/1981 | Tyllinen | .................. | E03F 1/006 210/195.3 |
| 4,750,705 A * | 6/1988 | Zippe | ..................... | F16K 31/003 137/248 |
| 6,854,479 B2 * | 2/2005 | Harwood | ................ | F04D 13/16 137/574 |
| 7,458,387 B2 * | 12/2008 | McGill | ................ | F16K 3/0209 137/39 |
| 8,051,873 B2 * | 11/2011 | Mullen | ..................... | E03F 5/22 137/371 |
| 9,458,617 B1 | 10/2016 | Bramble et al. | | |

(Continued)

FOREIGN PATENT DOCUMENTS

CN         109595380 A *    4/2019            F16K 31/06

*Primary Examiner* — Angelisa L. Hicks
(74) *Attorney, Agent, or Firm* — Finch & Maloney PLLC

(57) ABSTRACT

A sump pump system for a residential building has a sump with an inlet that receives water from an external source, a pump positioned with the sump, the pump having a pump inlet in fluid communication with the sump and an outlet in communication with a fluid destination, a valve connected to the inlet of the sump, the valve being movable between an open position in which fluid is permitted to enter the sump via the inlet, and a closed position, in which fluid is prevented from entering the sump via the inlet, wherein the valve is biased toward the closed position, and a valve restraint that is electrically actuated between a first state and a second state. In the first state, the valve restraint holds the valve open and in the second state, the valve restraint releases the valve.

12 Claims, 5 Drawing Sheets

(56) References Cited

U.S. PATENT DOCUMENTS

| | | | |
|---|---|---|---|
| 10,208,747 B2* | 2/2019 | Cummings | F04B 23/021 |
| 2005/0271517 A1* | 12/2005 | Terrell | F04B 49/04 |
| | | | 417/40 |
| 2009/0293957 A1* | 12/2009 | White | F16K 3/0254 |
| | | | 137/1 |

* cited by examiner

SAFETY VALVE FOR SUMP PUMP

TECHNICAL FIELD

This relates to a sump pump system, and in particular a sump pump system that prevent floods in the event of pump failure.

BACKGROUND

Sump pump systems prevent flooding of residential buildings by collecting water that settles around the foundation of the building and pumping that water up to the ground surface away from the building. An example of a sump pump system is given in U.S. Pat. No. 9,458,617 entitled "Sump pump apparatus and method".

SUMMARY

According to an aspect, there is provided a sump pump system for a residential building, comprising a sump having an inlet that receives water from an external source. A pump is positioned within the sump, the pump having a pump inlet in fluid communication with the sump and an outlet in communication with a fluid destination. A valve is connected to the inlet of the sump, the valve being movable between an open position, in which fluid is permitted to enter the sump via the inlet, and a closed position, in which fluid is prevented from entering the sump via the inlet, wherein the valve is biased toward the closed position. A valve restraint may be electrically actuated between a first state, in which the valve restraint holds the valve in the open position, and a second state in which the valve restraint releases the valve, the valve restraint being maintained in the first state by a power supply, and switching to the second state when the power supply is interrupted.

According to other aspects, the sump pump system may include one or more of the following aspects, alone or in combination: the valve may be a gate valve comprising a valve body that defines a flow passage and a gate that selectively closes the flow passage; the valve may be biased toward the closed position by a spring; there may be a ferrous element carried by to the valve, and wherein the valve restraint comprises an electromagnetic element, wherein the power supply supplies power to the electromagnetic element to attract the ferrous element and hold the valve in the open position; and the valve restraint may comprise a pin that engages and holds the valve in the open position, the pin retracting away from the valve when the power supply is interrupted; there may be a water level detector that detects a water level within the sump, the water level detector being configured to actuate the valve restraint from the first state to the second state.

According to an aspect, there is provided a method of installing valve for a sump pump system comprising a sump having an inlet that receives water from an external source and a pump positioned within the sump. The pump has an inlet in fluid communication with the sump and an outlet in communication with a fluid destination. The method may comprise the steps of:
  providing a valve having a valve member that is movable between an open position and a closed position;
  attaching the valve to the inlet of the sump such that, with the valve member is in the open position, fluid is permitted to enter the sump via the inlet and, with the valve member in the closed position, fluid is prevented from entering the sump via the inlet;
  biasing the valve member toward the closed position;
  providing a valve restraint that is electrically actuated between a first state, in which the valve restraint holds the valve member in the opened position, and a second state in which the valve restraint releases the valve member; and
  connecting a power supply to the valve restraint, wherein the valve restraint is maintained in the first state by the power supply, and switches to the second state when the power supply is interrupted.

According to other aspects, the method may include one or more of the following aspects, alone or in combination: the valve may be a gate valve comprising a valve body that defines a flow passage and the valve member comprises a gate that selectively closes the flow passage; and attaching the valve to the inlet of the sump may comprise attaching the valve body to the inlet of the sump; the valve may be biased toward the closed position by a spring; the valve restraint may comprise an electromagnet, the power supply supplies power to the electromagnet to maintain the valve member in the open position; the valve restraint may comprise a pin that engages and holds the valve in the open position, the pin retracting away from the valve when the power supply is interrupted; and the method may further comprise the step of providing a water level detector that detects a water level within the sump, the water level detector being configured to interrupt the power supply when a predetermined water level is detected.

In other aspects, the features described above may be combined together in any reasonable combination as will be recognized by those skilled in the art.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION OF PREFERRED EMBODIMENTS

Figure 1:
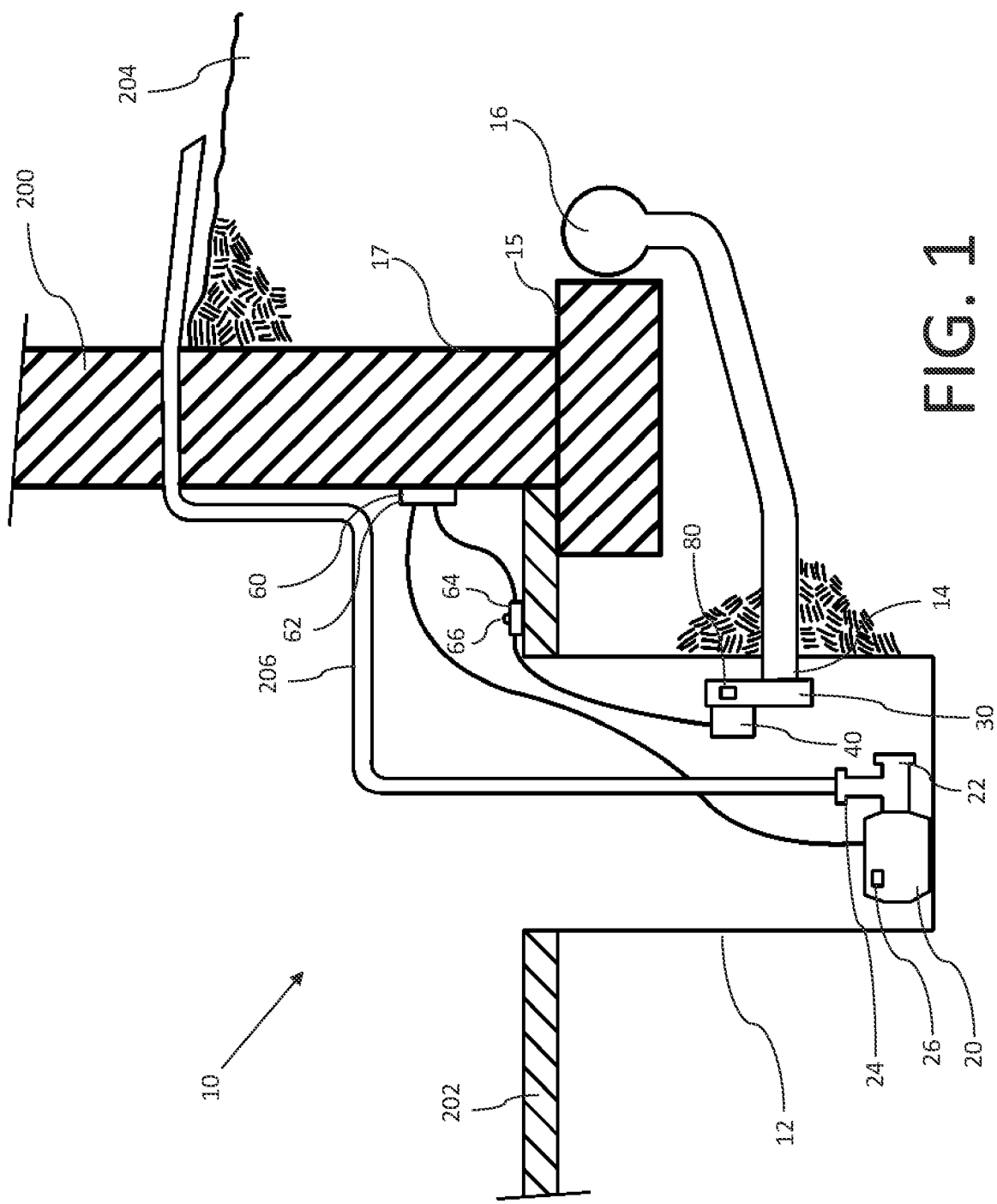
FIG. 1 is a side elevation view in section of a sump pump system installed in a residential building.

A sump pump system, generally identified by reference numeral 10, will now be described with reference to FIG. 1 through 7. Sump pump system 10 is designed for use in a residential building 200, particularly to prevent flooding of residential building 200 in the case of a failure of the sump pump 20, such as due to a loss of power.

Referring to FIG. 1, sump pump system 10 has a sump 12 with an inlet 14 that receives water from an external source. Sump 12 is shown as being installed below the floor 202 in the basement of residential building 200 and receives water from weeping tile 16 installed adjacent to the footing 15 of the basement wall 17. While this is a typical installation, it will be understood that water may drain into sump 12 from other external sources or using different designs. For example, weeping tile 16 may be in a different location or may be a different drainage system. In addition, sump 12 may be substantially level with, or only slightly below, weeping tile 16, depending on the requirements of a particular design and the building codes.

System 10 includes a pump 20 positioned within sump 12 that has a pump inlet 22 in communication with sump 12 and an outlet 24 in communication with a fluid destination 204. As shown, fluid destination 204 is a discharge pipe that discharges the water at an above-ground location that is spaced a safe distance from basement wall 17. Fluid destination may be other types of drainage systems as permitted by regulations and the particular circumstances. Pump 20 is configured to pump water from sump 12 to fluid destination 204 through an outlet conduit 206, which may be equipped with additional components well known in the art such as a check valve. Various designs of pump 20 are known and may be used.

Figure 2:
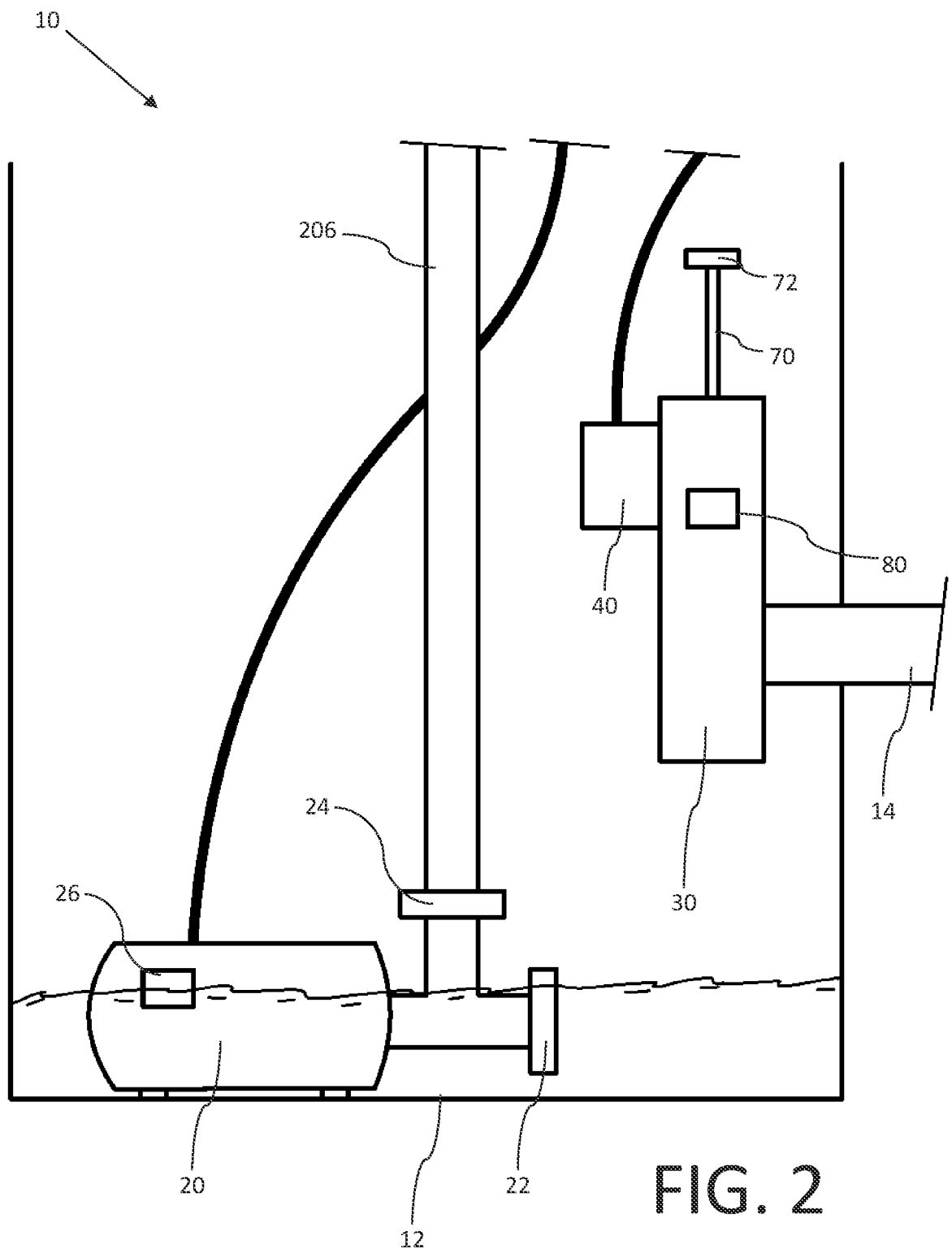
FIG. 2 is a side elevation view in section of a sump pump system with a first water level.
Figure 3:
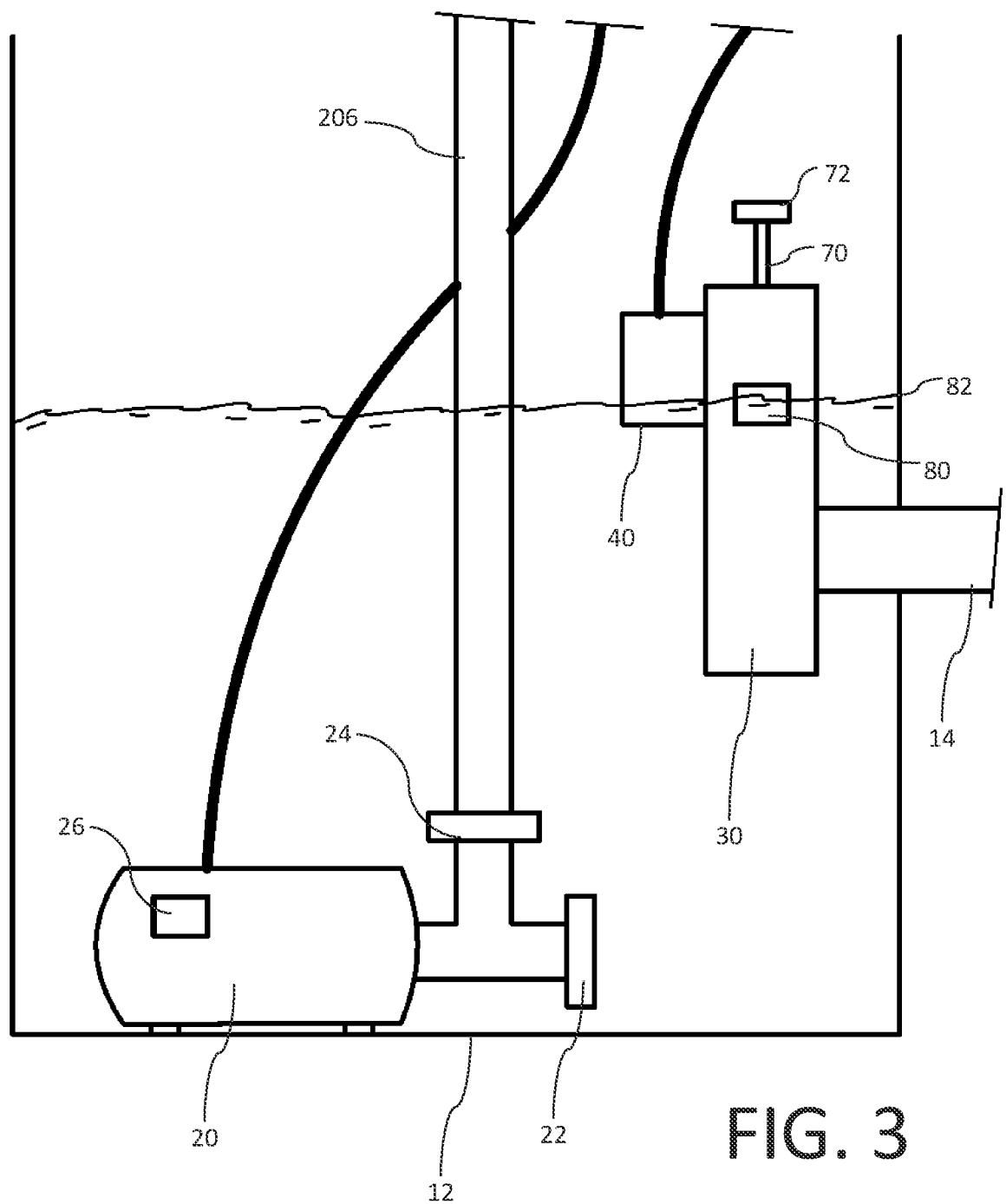
FIG. 3 is a side elevation view in section of a sump pump system with a second water level.

Referring to FIG. 2 and FIG. 3, valve 30 is connected to inlet 14 of sump 12. Valve 30 is movable between an open position that permits water to enter sump 12 via inlet 14, and a closed position that prevents water from entering sump 12 via inlet 14. Valve 30 is moved to the closed position in the event of a failure of pump 20, such as a loss of power. In this example, valve 30 may be biased toward the closed position, and held open by a mechanism that maintains valve 30 in the open position as long as power is supplied to pump 20. If power to pump 20 is interrupted, valve 30 will be released to move to the closed position.

Figure 4:
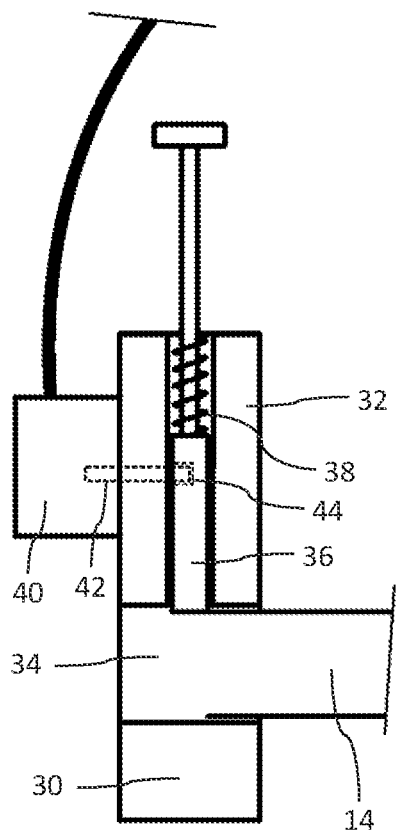
FIG. 4 is a side elevation view in section of a valve held in an open position by a pin.

Referring to FIG. 4, valve 30 may be a gate valve that has a valve body 32 and a gate 36 that selectively closes a flow passage 34 through valve body 32. Valve 30 is show in the open position in FIG. 4, and the closed position in FIG. 5. In the depicted example, gate 36 is biased toward the closed position by a spring 38 that urges gate 36 to traverse and close flow passage 34 but is prevented from moving by a valve restraint 40. Gate 36, or valve 30 more generally, may be biased in other ways toward a closed position. Other types of valves may also be used, such as a ball valve, that preferably do not restrict the flow of water along flow passage 34 when in the open position.

Figure 5:
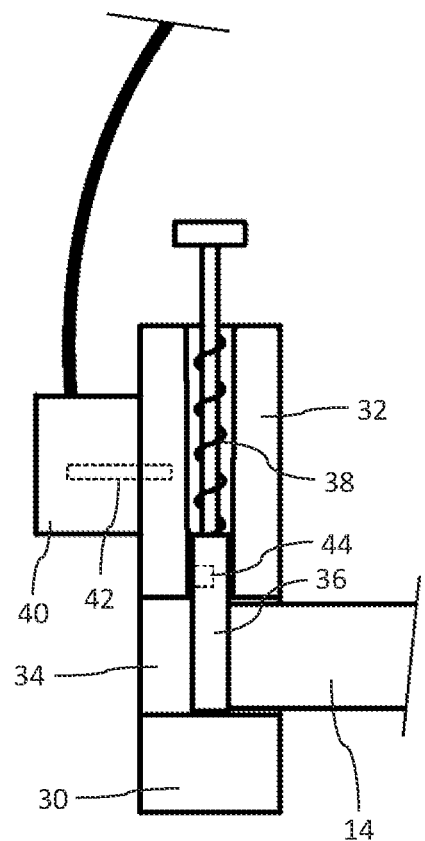
FIG. 5 is a side elevation view in section of a valve in a closed position.

In an example, depicted in FIG. 4 and FIG. 5, valve restraint 40 may have a pin 42 that, when valve restraint is in the first state, engages and holds valve 30 in the open position, such as by being inserted into a recess 44 of gate 36. Pin 42 retracts from valve 30 when power supply 60 is interrupted to allow valve 30 to close.

Figure 6:
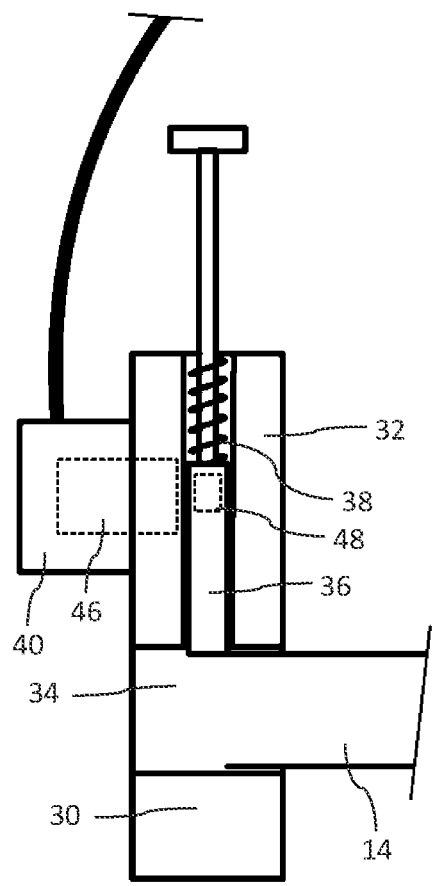
FIG. 6 is a side elevation view in section of an alternate design of a valve held in an open position by an electromagnet.
Figure 7:
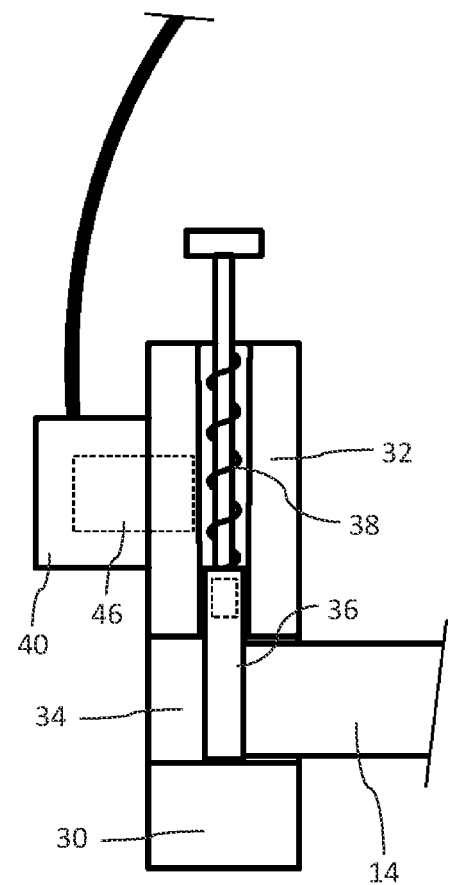
FIG. 7 is a side elevation view in section of an alternate design of a valve in a closed position.

In another example, depicted in FIG. 5 and FIG. 6, valve restraint 40 may be an electromagnet powered by power supply 60 that uses magnetic attraction to keep valve gate 36 open. For example, there may be an electromagnet 46 and a ferrous element 48 as shown. Power supply 60 supplies power to electromagnetic element 46 to attract ferrous element 48 and hold valve 30 in the open position. When power supply 60 is interrupted, electromagnetic element 46 stops attracting ferrous element 48, and valve 30 moves from the open position to the closed position.

Valve 30 may be designed to be automatically reset when the failure is resolved, or it may have a manual actuator 70 that allows valve 30 to be reset from the closed position to the open position. As depicted, valve 30 has a handle 72 that can be manually reset by a human operator. Handle 72 may be used to pull gate 36 out of flow passage 34 and into a position in which pin 42 can be reinserted into recess 44, or ferrous element 48 is brought sufficiently close to electromagnetic element 46 once the failure is resolved.

Referring to FIG. 4, valve restraint 40 may be carried by, installed on, or integrated within valve 30, and is actuated between a first state and a second state. In the first state, valve restraint 40 holds valve 30 in the open position and in the second state, valve restraint 40 releases valve 30 to move from the open position to the closed position under a biasing force. Referring again to FIG. 1, valve restraint 40 interacts with gate 36 and is maintained in the first state by a power supply 60, and switches to the second state when power supply 60 is interrupted. Power supply 60 may be a power system of residential building 200 in which case valve restraint 40 may be powered by a conventional electrical outlet 62. Other electrical power sources and electrical connections may be used. In the depicted example, valve restraint 40 is connected to power supply 60 by an AC/DC power adapter 64 that provides a 12V DC signal to valve restraint 40. Power adapter 64 may also include an indicator 66 that provides a visual indication of the state of power supply 60 and/or valve 30. For example, indicator 66 may be a light that turns on or off, change color, or otherwise provide a visual indication that valve restraint 40 is in the second state or that valve 30 is in the closed position.

Referring to FIG. 2, a typical sump pump 20 has a water level detector 26 that triggers pump 20 to turn on when water within sump 12 reaches a predetermined level 28, indicating that sufficient water is present to activate sump pump 20. Water level detector 26 is shown as being located on pump 20, although there are various ways in which water level detector 26 may be installed. For example, it may be separately located within sump 12 and communicate with pump 20 to control its operation.

Pump 20 may experience a failure for different reasons, such as a power interruption, as a result of a blockage, a mechanical or electrical failure within pump 20, etc. System 10 may be designed to react to one or more of these reasons.

As shown in FIG. 1, pump 20 may be connected to power supply 60 separate from the power connection to valve restraint 40. However, as pump 20 and valve restraint 40 will be powered by the same residential electrical circuit, an interruption in power will affect both. It will be understood that a power supply may also be designed that connects to both valve restraint 40 and pump 20 if deemed to be more convenient. In another example, adapter 64 may include an electrical socket into which pump 20 may be connected. Since a power failure will result in pump failure, power supply 60 being interrupted causes valve 30 to close to reduce the inflow of water into sump 12 and reduce the likelihood of building 200 flooding in when pump 20 is unable to pump out fluid.

Referring to FIG. 3, sump pump system 10 may have a second water level detector 80 that detects a second water level 82 within sump 12. For example, upper water level detector 80 may be carried by valve 30 or valve restraint 40, and may be configured to actuate valve restraint 40 from the first state to the second state upon water within sump 12 reaching second water level 82. Upper water level detector 80 may actuate valve restraint 40 by interrupting power supply 60, by interrupting a power signal from power supply 60 to valve restraint 40. Upper water level detector 80 may protect against overflowing of sump 12 if pump 20 fails, a blockage occurs, or the water level in sump 12 is otherwise unable to be sufficiently reduced. In one example, upper water level detector 80 may actuate an electrical switch to interrupt the power supply to valve restraint 40, causing it to close valve 30 in the same way that would occur if the residential power were to fail.

Other types of sensors may be provided that cause valve 30 to close if a failure condition is detected.

A method of installing valve 30, as described above, into sump pump system 10 will now be described. Valve 30 may be used to retrofit an existing sump 12 with inlet 14 and pump 20. Valve 30 is attached to inlet 14 of sump 12, such that with valve 30 in the open position, fluid is permitted to enter sump 12 and, with valve 30 in the closed position, fluid is prevented from entering sump 12. As shown in FIG. 4 through FIG. 7, valve 30 may have a valve body 32 that is attached to inlet 14 and a flow passage 34 through which fluid can pass to enter sump 12 from inlet 14. Flow passage 34 may be sized such that valve 30 can be attached by inserting the end of inlet 14 at least partially into flow passage 34, where it may be held in place by friction fit, interference fit, glue, fasteners, or other methods that are well known in the art. Valve restraint 40 is provided and connected to power supply 60, and valve 30 is biased toward the closed position and moved to the open position.

In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be one and only one of the elements.

The scope of the following claims should not be limited by the preferred embodiments set forth in the examples above and in the drawings, but should be given the broadest interpretation consistent with the description as a whole.

What is claimed is:

1. A sump pump system for a residential building, comprising:
   a residential building having an exterior wall that defines an interior space;
   a sump disposed within the interior space, the sump having an inlet, the inlet comprising an end of a pipe, the pipe receiving water from an external source outside the exterior wall, the end of the pipe being disposed to discharge water into the sump;
   a pump positioned within the sump, the pump having a pump inlet in fluid communication with the sump and an outlet in communication with a fluid destination, the pump being powered by a power supply; and
   a valve comprising a valve body, a valve member, a valve restraint, and a water level detector carried by the valve body, the valve body defining a flow passage, the valve body engaging the pipe of the inlet of the sump such that the flow passage is in fluid communication with the inlet of the sump and such that the valve is wholly supported by the pipe, the valve member being movable between an open position that permits fluid to enter the sump via the end of the pipe and a closed position that closes the flow passage and prevents fluid from entering the sump via the end of the pipe, wherein the valve member is biased toward the closed position;
   wherein:
      the valve restraint has a first state, in which the valve restraint holds the valve member in the open position, and a second state in which the valve restraint releases the valve member, the valve restraint being maintained in the first state by the power supply such that the valve restraint switches to the second state when the power supply is interrupted; and
      the water level detector is configured to actuate the valve restraint from the first state to the second state when a water level is detected by the water level detector.

2. The sump pump system of claim 1, wherein the valve is a gate valve comprising: a valve body that defines a flow passage, and a gate that selectively closes the flow passage.

3. The sump pump system of claim 1, wherein the valve is biased toward the closed position by a spring.

4. The sump pump system of claim 1, further comprising a ferrous element carried by the valve, and wherein the valve restraint comprises an electromagnetic element, wherein, in the first state, the power supply supplies power to the electromagnetic element to attract the ferrous element and hold the valve in the open position.

5. The sump pump system of claim 1, wherein the valve restraint comprises a pin that, in the first state, engages and holds the valve in the open position, the pin retracting away from the valve when the power supply is interrupted.

6. The sump pump system of claim 1, wherein the valve body engages the end of the pipe by a friction fit or an interference fit.

7. A method of installing a valve in a sump pump system of a residential building having an exterior wall, the sump pump system comprising a sump that receives water from a source outside the exterior wall of the residential building via an inlet, the inlet comprising an end of a pipe, the pipe being in in fluid communication with the source outside the exterior wall, the end of the pipe being disposed to discharge water into the sump, the sump pump system further comprising a pump positioned within the sump, the pump having a pump inlet in fluid communication with the sump and a pump outlet in communication with a fluid destination, the pump being powered by a power supply, the method comprising the steps of:
   providing a valve comprising a valve body, a valve member, a valve restraint, and a water level detector carried by the valve body, the valve body defining a flow passage and a valve mount;
   mounting the valve to the inlet of the sump by engaging the valve mount to the end of the pipe such that the flow passage is in fluid communication with the inlet of the sump and such that the valve is wholly supported by the engagement between the valve mount and the inlet of the sump;
   wherein the valve member is movable between an open position and a closed position, the valve member being biased toward the closed position such that, with the valve member in the open position, fluid is permitted to enter the sump via the end of the pipe and, with the valve member in the closed position, the valve member closes the fluid passage such that fluid is prevented from entering the sump via the end of the pipe, the valve comprising a valve restraint that is electrically actuated between a first state, in which the valve restraint holds the valve member in the opened position, and a second state in which the valve restraint releases the valve member;
   the water level detector is configured to actuate the valve restraint from the first state to the second state when a water level is detected by the water level detector; and
   connecting the power supply to the valve restraint, wherein the valve restraint is maintained in the first state by the power supply and switches to the second state when the power supply is interrupted.

8. The method of claim 7, wherein:
the valve member comprises a gate that selectively closes the flow passage.

9. The method of claim 7, wherein the valve member is biased toward the closed position by a spring.

10. The method of claim 7, wherein the valve restraint comprises an electromagnet and the power supply supplies power to the electromagnet to maintain the valve member in the open position.

11. The method of claim 7, wherein the valve restraint comprises a pin that engages and holds the valve member in the open position, the pin retracting away from engagement with the valve member when the power supply is interrupted.

12. The method of claim 7, wherein the valve body engages the end of the pipe by a friction fit or an interference fit.

\* \* \* \* \*